United States Patent [19]
Deans

[11] 3,778,975
[45] Dec. 18, 1973

[54] GAS CHROMATOGRAPHY

[75] Inventor: David Robert Deans, Stockton-on-Tees, England

[73] Assignee: Imperial Chemical Industries Limited, London, England

[22] Filed: Oct. 29, 1971

[21] Appl. No.: 193,708

[30] Foreign Application Priority Data
Nov. 9, 1970  Great Britain.................. 53,117/70

[52] U.S. Cl. .............................. 55/197, 73/422 GC
[51] Int. Cl........................ B01d 15/08, B21d 43/10
[58] Field of Search....................... 55/67, 197, 386; 73/23.1, 422 GC

[56] References Cited
UNITED STATES PATENTS
3,656,277  4/1972  Slingerland .............................. 55/67
3,498,027  3/1970  Buchtel................................. 55/197

Primary Examiner—Charles N. Hart
Attorney—Cushman, Darby & Cushman

[57] ABSTRACT

"Tailing" of peaks in gas chromatography is reduced by providing a bleed of gas through places in chromatographic apparatus which part of a sample may enter and thus be held up.

5 Claims, 1 Drawing Figure

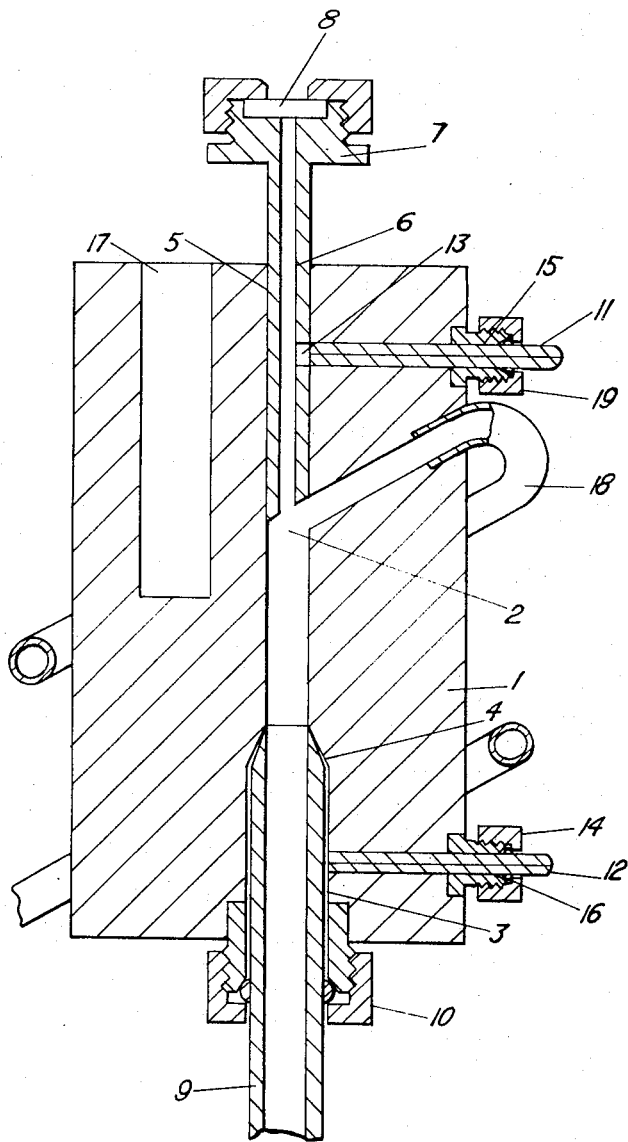

GAS CHROMATOGRAPHY

THIS INVENTION relates to gas chromatography.

In gas chromatography a carrier gas is passed through a gas chromatographic column, a sample containing a number of components is injected into the carrier gas and the components separate as they pass through the column and are detected in the effluent from the column as peaks in a detector signal.

It is commonly observed that the peaks corresponding to components emerging from the column have "tails", i.e., the peaks are not symmetrical, a small quantity of the component emerging over a period after the passage of the main part of the peak. Such "tailing" complicates interpretation of the results, especially when a peak of the second component occurs during passage of a "tail."

"Tailing" is in some cases due to the nature of the packing in the chromatographic column; in particular packings of which the partition co-efficient of the component between the packing and the vapour phase declines with increasing concentration of the component in the vapour phase (i.e., a smaller proportion of the component is sorbed as its concentration increases) show this effect. However, we have found that "tailing" is often caused also by geometrical factors.

In general we find that if there is any unswept volume at any point to which sample is carried, sample which enters such volume diffuses from it over a period and thus causes "tailing." By "unswept volume" is meant a volume within a gas chromatographic apparatus communicating with the gas chromatographic stream but through which no major flows of the stream or of carrier gas occur during normal operation of the apparatus. Such unswept volume includes not only recesses but also volume caused by angles especially acute or right angles in conduits along which the gas is passing.

It is unfortunately a matter of extreme difficulty to produce a gas chromatographic system which does not contain unswept volume, and this problem is aggravated by the normal method of sample injection which is used. In this, a liquid sample is injected through a septum using a hypodermic syringe and expelled as droplets into the carrier gas stream. This involves the presence of unswept volume in the neighbourhood of the septum, and since it is in general necessary to apply heat to vaporise the sample and septa are normally not very heat-resistant, it is usual to position the septum at a considerable distance from the point of injection and to bring the sample to the required position by pushing a considerable length of the needle of the hypodermic syringe through the septum until the tip of the needle is in the required position. This design involves the presence of unswept volume. The problem is particularly important at this point because expansion of the sample on vaporisation tends to drive sample into unswept volumes even if they are up-stream from the point of injection. Unswept volumes tend to occur also where pieces of tube are united to one another or to other apparatus by means of a conventional tube coupling.

This invention is based on providing small bleeds of gas through unswept volumes from or to the chromatographic gas stream, so that any sample or component entering the unswept volumes will bleed away, preferably to the atmosphere, rather than contributing to a "tail," or so that flow of gas to the chromatographic gas stream will prevent sample entering the unswept volume or carry it quickly back to the said stream.

The invention enables relatively large unswept volumes to be tolerated and this may so reduce constraints on the design of chromatographic systems that several small unswept volumes may be rendered unnecessary.

The invention comprises a gas chromatographic system in which a restricted vent from the chromatographic gas stream is provided from an unswept volume.

The invention also comprises a union piece for connecting units of a gas chromatographic system through which union piece gas is to flow, which union piece encompasses an unswept volume, the union piece comprising a restricted vent from the chromatographic gas stream from the unswept volume.

The invention also comprises a sample injector for a gas chromatographic system which comprises a restricted vent from the chromatographic gas stream from an unswept volume.

The sample injector may comprise a carrier gas conduit, an injection conduit for leading from a septum holder to the carrier gas conduit in a substantially straight line to permit the passage down it of a hypodermic needle, and a restricted vent from the injection conduit to the atmosphere surrounding the sample injector.

Preferably the carrier gas conduit is provided on its output side with means to connect it to a chromatographic column which comprises a restricted vent from an unswept volume encompassed by the said means to the atmosphere surrounding the sample injector.

If the restricted vents are supplied outside the apparatus with carrier gas at a higher pressure than that applying to them within the apparatus, (for example, if they communicate with the atmosphere surrounding the apparatus, by providing the apparatus with a vessel surrounding the restricted vents, to which an elevated pressure is applied), a flow of gas to the chromatographic gas stream will prevent sample entering the unswept volume or carry it quickly back to the said stream.

Preferably also the sample injector comprises means to heat the carrier gas conduit. Suitably the carrier gas conduit and the injection conduit may be formed in a metal block, preferably of high thermal conductivity, for example a brass block, which is provided with means for heating it, for example an electrical heating coil.

The septum holder may be mounted on a sleeve for fitting in the injection conduit, the sleeve being formed, if it projects past a restricted vent in the injection conduit, with a hole in its wall corresponding to the inlet of the restricted vent.

The means to connect the sample injector to the chromatographic column may comprise an enlarged outlet portion of the carrier gas conduit with walls adapted to form the socket of a cone and socket joint with a tube leading to a chromatographic column, the inlet end of which is formed as a corresponding cone. A restricted vent is preferably provided to lead from between the tube and the enlarged part of the carrier gas conduit on the output side of the cone and socket joint to the atmosphere.

One form of sample injector according to the invention will now be described with reference to the drawing which shows a cross-section through the sample injector.

A brass block 1 is bored out to produce a carrier gas conduit 2 having an outlet 3 which is enlarged, the neck 4 leading to the enlarged outlet 3 being conical in form. A conically ended tube 9 leading to a chromatographic column (not shown) is secured into the outlet 3 by means of a conventional olive compression coupling 10.

A further bore 5 constitutes a sample injection conduit, into which is inserted a sleeve 6 on which is mounted a septum holder 7 containing a septum 8.

Restricted vents 11 and 12 lead respectively from sleeve 6 which has a port 13 passing through its wall in register with vent 11 and a gap between tube 9 and outlet 3. Both restricted vents are capillaries held in position by conventional compression couplings 19 and 14 which act on deformable metal olives 15 and 16.

A blind ended bore 17 is provided for accommodating an electrical cartridge heater (not shown).

The inlet to conduit 2 is united by soldering to the inserted end of an inlet tube 18 which is wound round the block 1 to form a helix.

The apparatus acts as follows:

The block 1 is heated by a heater in bore 17 and carrier gas passed through the helical tube 18, during which movement the carrier gas becomes warm, and through conduit 2.

When it is desired to inject a sample, the needle of a hypodermic syringe is pushed through the septum 8 and down sleeve 6 until its tip enters conduit 2. Liquid sample is then injected from the needle into conduit 2 and the needle is withdrawn.

On contact with the heated carrier gas and the block 1 the sample vaporises and expands thus forcing part of the sample back into sleeve 6 and also back up conduit 2 and between the tube 9 and outlet 3.

The sample in conduit 2 passes through in a block, but sample passing into sleeve 6 passes, because of the positive pressure in the apparatus, up the sleeve and out to the atmosphere through restricted vent 11 thus minimising "tailing" of the sample through diffusion back into conduit 2. Similarly, sample between tube 9 and outlet 3 passes to the atmosphere through vent 12 thus minimising "tailing."

It will be understood that in this specification a restricted vent from a gas stream may in general function as a vent to the gas stream if desired if an appropriate pressure drop across it is provided.

I claim:

1. A sample injector for a gas chromatographic system which comprises a block of high thermal conductivity comprising a carrier gas conduit and a sample injection conduit leading to the carrier gas conduit in a substantially straight line, means to heat the block, a restricted vent from the sample injection conduit to an atmosphere surrounding the sample injector, a sleeve fitting into the injection conduit and permitting free flow to the restricted vent in the injection conduit and a septum holder mounted on the sleeve and spaced away from the heat conducting block.

2. A sample injector as claimed in claim 1 in which the carrier gas conduit is provided on its output side with means to connect it to a chromatographic column which means comprises a restricted vent from an unswept volume encompassed by the said means to an atmosphere surrounding the sample injector.

3. A sample injector as claimed in claim 1 in which the restricted vent from the injection conduit has means to supply it with carrier gas at a higher pressure than that applying to it on its chromatographic gas stream side.

4. A sample injector as claimed in claim 3 which comprises a vessel to which carrier gas at an elevated pressure may be applied and which surrounds the restricted vent.

5. A sample injector as claimed in claim 1 in which the block of comprises a metal of high thermal conductivity which is provided with an electrical heating coil.

* * * * *